July 7, 1964 S. R. WHITWORTH 3,140,360

MULTI-CHANNEL TAPE RECORDER AND PLAYBACK APPARATUS

Filed Aug. 17, 1959 3 Sheets-Sheet 1

INVENTOR.
SINGLETON R. WHITWORTH

BY [signature]

[signature]
ATTORNEYS

INVENTOR.
SINGLETON R. WHITWORTH
BY [signature]
[signature]
ATTORNEYS

INVENTOR.
SINGLETON R. WHITWORTH

BY [signature] [signature]
ATTORNEYS

United States Patent Office 3,140,360
Patented July 7, 1964

3,140,360

MULTI-CHANNEL TAPE RECORDER AND PLAYBACK APPARATUS

Singleton R. Whitworth, San Diego, Calif., assignor to the United States of America as represented by the Secretary of the Navy

Filed Aug. 17, 1959, Ser. No. 834,363
10 Claims. (Cl. 179—100.2)
(Granted under Title 35, U.S. Code (1952), sec. 266)

The invention described herein may be manufactured and used by or for the Government of the United States of America for governmental purposes without the payment of any royalties thereon or therefor.

The present invention relates to a tape recorder and playback system and more particularly to one capable of handling multiple messages in record, playback and storage operations.

Time and selectivity capability have become important limiting factors in the operation of tape recorder and playback systems. It early became clear that a human operator could listen to and properly evaluate a minimum number of messages at one time. The solution to this human limitation was the introduction into the recorder-playback system of storage of certain messages for readout at a later time with the result that the system became one involving recording, storage and playback functions. With the increasing complexity of the demand placed upon the recorder-playback system the degree of selectivity available to the operator as to which messages he could record, store, or playback became of ever-increasing importance. It also became evident that the time necessary to prepare a recorded message for readout was a limiting factor that should be reduced to a minimum. In certain environments such, for example, as in aircraft control towers the need for increased selectivity capability and for reduction of the time required for a recorded message to be available for readout have become crucial.

The present invention constitutes a reply to this dual need for obtaining maximum selectivity and speed in a recorder-playback system. According to the invention there is presented a recorder-playback system involving a series of individual recorder-playback bins each capable of concurrently handling a separate message. Each bin is a complete record-playback unit equipped with a supply and a take-up reel, a magnetic tape running between the reels, an erase and a record-playback head and drive actuating means. A control unit determines the type of operation, be it record, store or playback taking place in the individual record-playback units or channels, as they may be called. The function of the control unit is such that, without intervention by the operator, the different record-playback units automatically record sequentially in an unbroken cyclic sequence. When the last record-playback unit or channel has completed recording a message the sequence of recording automatically starts again in the first record-playback unit or channel and so the operation continues in cyclic fashion. During any recording operation any message previously on the tape is automatically erased to make way for the new incoming message. In each record-playback unit or channel as soon as the recording of a message therein has been completed the two reels between which the tape runs automatically are thrown into quick counter-rotation repositioning the tape to its starting point so that it becomes immediately available for readout or a later recording operation. The operator at will can selectively exclude any or all of the record-playback units or channels from this cyclic automatic recording operation, selecting them for either playback or storage. If he selects playback he gets readout immediately at either a normal or accelerated rate of speed, as he so designates. If he selects storage the message(s) on the so-selected record-playback unit(s) or channel(s) will continue to be stored until such time as the operator releases them. The time required for each record-playback unit or channel to complete a recording or playback operation is relatively short making for an intrinsic speed factor in the system.

An object of the present invention is the provision of a record-playback system wherein multiple messages can be concurrently recorded, stored and played back.

Another object is to provide a record-playback system wherein the operator has a high selectivity capability for designating multiple messages for record or playback or storage.

A further object is the provision of a record-playback system wherein individual messages are available for readout immediately after being recorded.

Still another object is the provision of a record-playback system wherein multiple messages can be sequentially and automatically recorded in an unending cycle without operator intervention.

Another object is to provide a record-playback system wherein messages can be stored indefinitely.

An additional object is to provide a record-playback system wherein there is an intrinsic high-speed capability for handling multiple messages in diverse operations.

Other objects and many of the attendant advantages will be readily appreciated as the same becomes better understood by reference to the following detailed description when considered in connection with the accompanying drawing in which like reference numerals designate like parts throughout the figures thereof and wherein.

Figure 6:
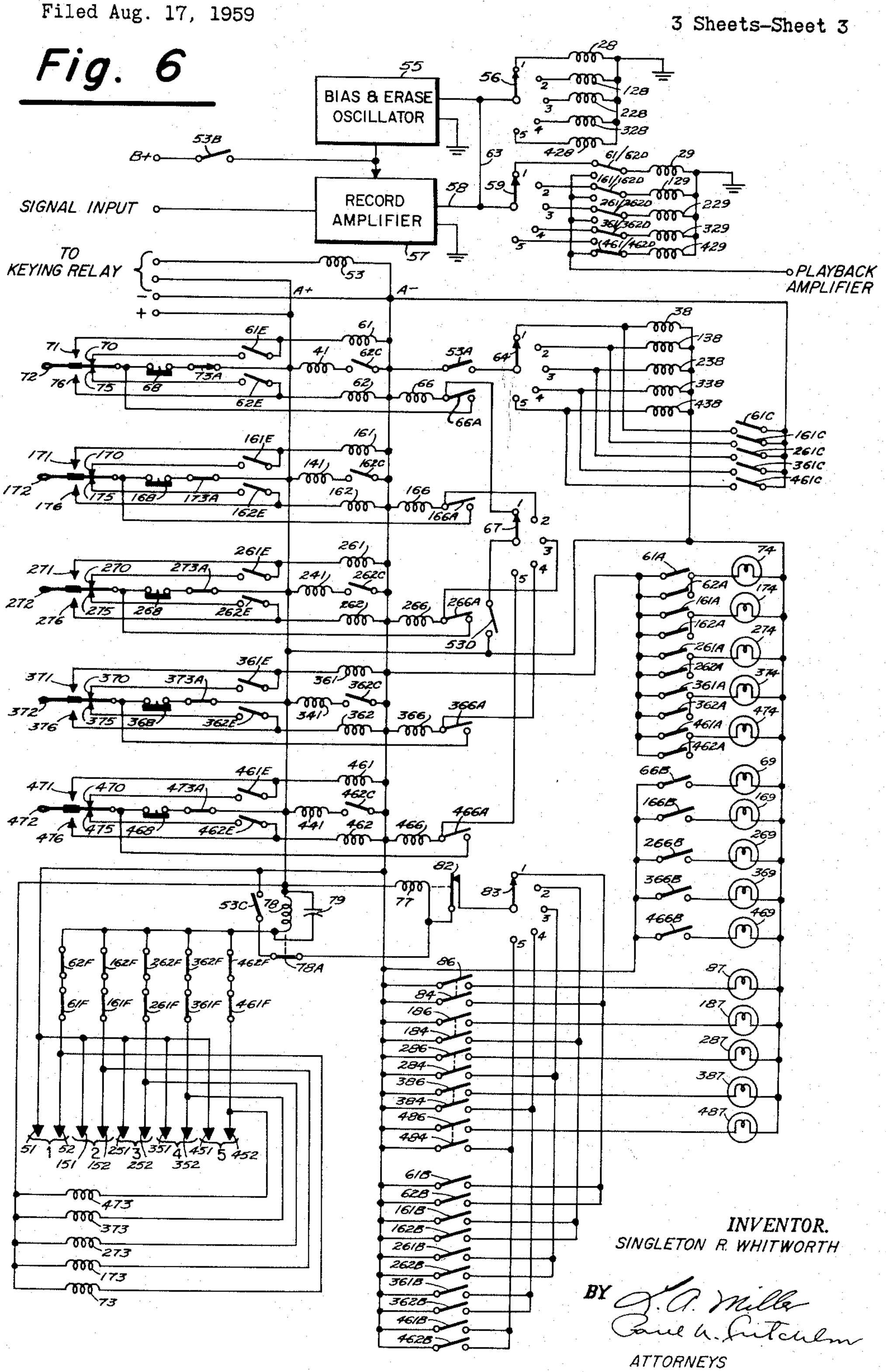

FIG. 6 a schematic diagram of the electrical control system.

The record-playback equipment comprises a series of separate, individual record-playback units 11 disposed in sequentially-spaced bins removably mounted in a console 12 and associated with a conventional motor-run drive means and an electromechanical control system 13 for individually controlling the operations of each record-playback unit causing them to either record or store or playback a message. The control system 13 embraces a control panel 14 which enables the operator to select the operation to be performed by any given record-playback unit and also indicates the type of operation taking place in any given record-playback unit.

*Individual Record-Playback Units With Drive Means*

Shafts 16 and 17 driven by motor 18 through pulleys 19, 21 and 22 constitute common drive means for the multiple record-playback units 11. Motor 18 runs continuously, causing continuous rotation of the shafts. Since pulley 21 is larger than pulley 22 shaft 17 rotates at a faster speed than does shaft 16. By a process later-to-be described the "normal" speed shaft 16 is "clutched in" as a source of drive power in the record operation and either "normal" speed shaft 16 or "fast" speed shaft 17 "clutched in" as the driver in the playback operation taking place in any given record-playback unit.

Figure 1:
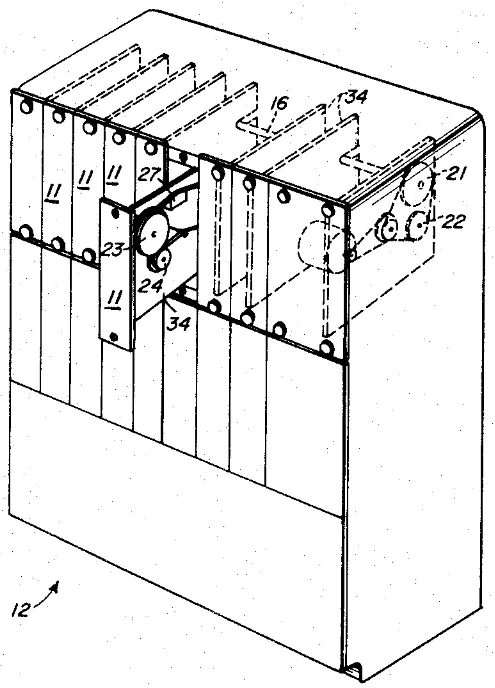
FIG. 1 is a perspective view of the record-playback equipment showing the bins in series.
Figure 2:
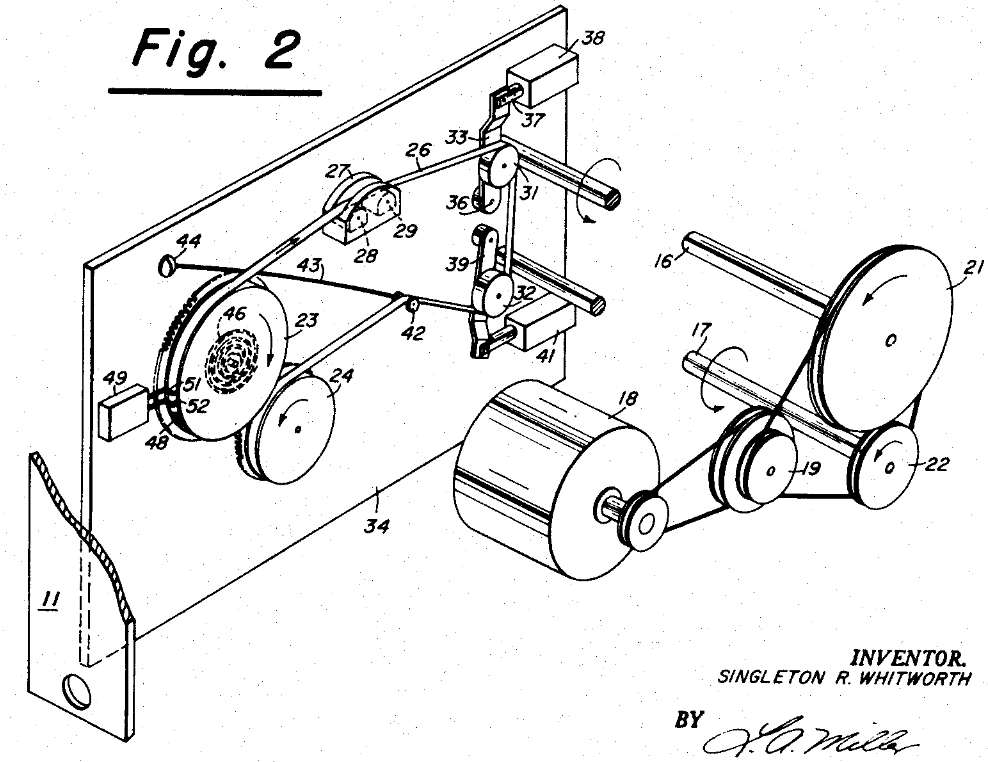
FIG. 2 is a perspective view of one of the individual record-playback units and the common drive means.

The balance of the structure of each record-playback unit is identical with that of all other units and similarly located in its respective bin and is best seen in FIG. 2. Each record-playback unit 11 contains two complementarily-geared reels which intermesh, one being larger than the other. The larger reel is supply reel 23 and the smaller reel is take-up reel 24. Magnetic tape 26 is connected at one end to supply reel 23 and at its other end to take-up reel 24. During the record and playback operations tape 26 unwinds from supply reel 23 and is wound upon take-up reel 24 with the supply reel 23 rotating clockwise, the take-up reel 24 counterclockwise and the tape 26 moving in the direction indicated by the arrows in FIG. 2.

As tape 26 leaves supply reel 23 it next passes over housing 27 which contains an erase head 28 and a record-playback head 29 in that order, both of conventional construction. During record operation erase head 28 is operative and record-playback head 29 functions as a recording head; during playback operation erase head 28 is inoperative and record-playback head 29 functions as a playback head.

Tape 26 then passes consecutively over pinch wheels 31 and 32 respectively. Pinch wheel 31 is suitably mounted for free rotation on arm 33 which is pivotally mounted at one end to bin frame 34 at 36 and has its other end connected to plunger 37 of solenoid 38 which is secured to the bin frame. Upon actuation of solenoid 38 the retracting movement of plunger 37 causes pinch wheel 31 to be swung in a clockwise direction about pivot point 36 until pinch wheel 31 is brought to bear against shaft 16. When pinch wheel 31 and shaft 16 are brought together in such fashion the rotational movement of shaft 16 is imparted to the pinch wheel causing it to rotate clockwise and tape 26 which passes between the two members to be carried off supply reel 23 at "normal" speed. Pinch wheel 32 is similarly mounted to arm 39 which is responsive to the actuation of solenoid 41 to bring pinch wheel 32 to bear against shaft 17 for driving tape 26 at "fast" speed. The nature of the control system is such that at no time will solenoids 38 and 41 be actuated simultaneously in a given record-playback unit or channel. In FIG. 2 shaft 16 is shown as the driver and shaft 17 as being inoperative.

Before it reaches the take-up reel 24 tape 26 passes over a tensioning roller 42. This tensioning roller 42 is suitably mounted for free rotation to the "floating" end of a leaf-spring member 43 which is fixedly mounted to bin frame 34 at 44. The tendency of member 43 to straighten out from its slightly curved shape puts a gentle tensioning action on tape 26 to remove any slight slack developed in the tape during its travel.

Figure 3:
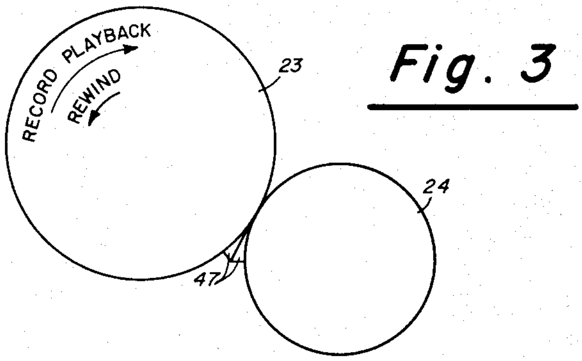
FIG. 3 shows the supply and take-up reel positions at the beginning of a record or playback operation and at the end of the rewind operation.
Figures 4, 5:
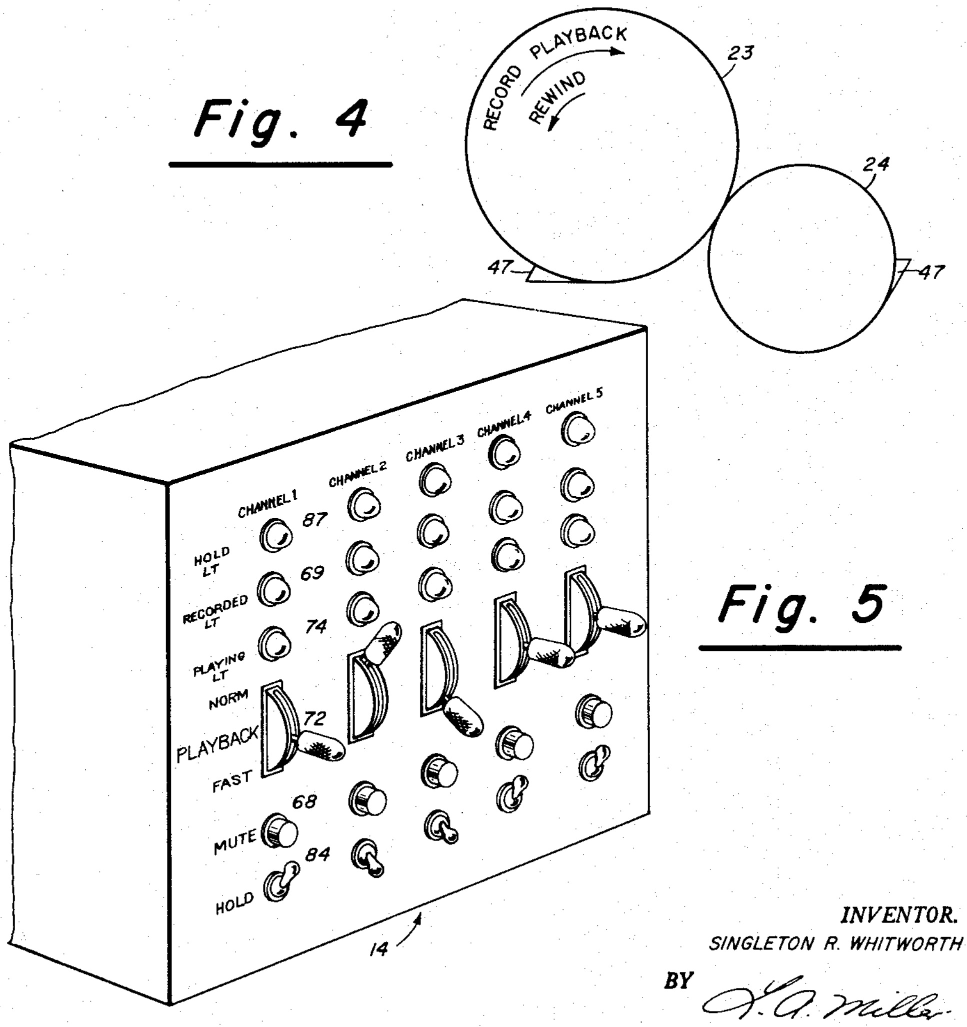
FIG. 4 shows the supply and take-up reel positions at some intermediate point.
FIG. 5 is a perspective view of the control panel.

Supply reel 23 has suitably connected to it a coil spring 46 urging it in a counterclockwise direction as seen in FIG. 2. Spring 46 performs two functions: it is the principal tensioning element for keeping tape 26 taut as it travels off supply reel 23 to take-up reel 24 and it also is the drive means for a quick- re-wind operation at the end of a record or play-back operation in the record-playback unit. At the end of a record or playback operation the control system releases tape 26 from whichever one of shafts 16 or 17 was operative as the drive means during the operation through the de-energization of the operative solenoid. When this occurs spring 46 takes over to reverse the direction of rotation of supply reel 23 and, accordingly, take-up reel 24 which intermeshes with it. To stop this rewind-rotation so that the reels and tape are brought back to the initial position where they were at the beginning of the record or playback operation and no farther there is mounted on the peripheral portion of each of reels 23 and 24 a substantially triangular-shape shoe 47. These shoes 47 are so mounted on supply reel 23 and take-up reel 24 that for the "initial" position they abut one another in locking relationship so as to prevent spring 46 from imparting any rotational thrust to either reel. This position is portrayed by FIG. 3. As the supply reel 23 rotates clockwise playing out tape 26 during a record or playback operation, because of the difference in diameters of the two reels, there develops a difference in the relative angular displacement of shoes 47 which increases as the supply reel continues to unwind. FIG. 4 portrays such condition. When the rotation of the reels is reversed shoes 47 draw closer together until they abut again at the "initial" position. Thus shoes 47 act to stop the rewind rotation at just the right spot.

At the end of tape 26 as it comes off supply reel 23 there is spliced in series with the tape a metallic strip 48 of conducting metal. Mounted next to supply reel 23 for cooperative engagement with this metallic strip 48 is an end-of-reel wiper 49 which has two L-shaped contacts 51 and 52, of spring-steel copper or like suitable material, which ride over tape 26 as it sits on supply reel 23. As supply reel 23 plays out to its end metallic strip 48 will serve as a short circuit between wiper contacts 51 and 52 for a control function which will be described later.

*Control System*

FIG. 6 portrays the electromechanical control system 13. The control system has arbitrarily been shown for record-playback equipment comprising five record-playback units or channels. In the following description of the control system 13 each record-playback unit will be referred to as a "channel" and where the structure of the control system is identical for each channel and there is no need to set forth multiple channel structure to portray a portion of this control system the structure of channel 1 will be described.

*Structure for Recording on Channel 1 With Actuation of "Recorded" Light*

In series, running from A— to A+, are relay 53 and keying relay 54.

In series, running from B+ to ground, are normally-open, relay-actuated contact 53B, bias and erase oscillator 55, stepper-actuated selector switch 56 and erase head 28.

In series, running from a source of input signal to ground, are record-amplifier 57, connection 58, stepper-actuated selector switch 59, normally closed, relay-actuated, double throw contact 61/62D and head 29 acting as a record head. Connection 63 leads from bias-and-erase oscillator 55 and runs to connection 58.

In series, running from A— to A+, are normally-open, relay-actuated contact 53A, stepper-actuated selector switch 64 and solenoid 38, previously noted in the description of the individual record-playback unit.

In series, running from A— to A+, are relay 66, stepper-actuated selector switch 67 and normally-open, relay-actuated contact 53D. Shunting selector switch 67 and contact 53D are relay-actuated contact 66A and normally-closed mute switch 68.

In series, running from A— to A+, are normally-open, relay-actuated contact 66B and "recorded" light 69.

*Structure for Normal Speed Playback on Channel 1 With Actuation of "Playing" Light*

In series, running from A— to A+, are relay 61, fixed contact 71, neutral-biased, hand-operated toggle switch 72, normally-closed mute switch 68, and normally-closed, relay-actuated contact 73A. Shunting fixed contact 71 and neutral-biased, hand-operated toggle switch 72 is normally-open, relay-actuated holding contact 61E.

In series, running from A— to A+, are normally-open, relay-actuated contact 61A and "playing" light 74.

In series, running from A— to A+, are normally-open, relay-actuated contact 61C and solenoid 38.

In series, running from ground to the playback amplifier 75, are head 29, operating as a playback head, and normally-open, relay-actuated, double-throw contact 61/62D.

*Structure for Fast Speed Playback on Channel 1 With Actuation of "Playing" Light*

In series, running from A— to A+, are relay 62, fixed contact 76, neutral-biased hand-operated toggle switch 72, normally-closed mute switch 68 and normally-closed, relay-actuated contact 73A.

In series, running from A— to A+, are normally-open, relay-actuated contact 62A and "playing" light 74.

In series, running from A— to A+, are normally-open, relay-actuated contact 62C and solenoid 41, previously noted above in the description of the individual record-playback unit 11.

In series, running from ground to playback amplifier 75, are head 29, operating as a playback head, and normally-open, relay-actuated double-throw contact 61/62D.

*Structure for Controlling Sequential Recording Cycle With Selective Storage and Playback Interaction*

In series, running from A+ to A—, are stepper relay 77, normally-closed, relay-actuated contact 78A and normally-open, relay-actuated contact 53C.

In series, running from A+ to A—, are relay 78 and a bank of end-of-reel wiper circuit sections arranged in parallel with respect to each other. Each end-of-reel wiper circuit section corresponds to a given channel and comprises, in series, two end-of-reel wiper contacts 51 and 52 and two normally-closed, relay-actuated contacts. Normally there is a gap in the wiper circuit section between the wiper contacts which keep the wiper circuit section open but when metallic strip 48 on runout of supply reel 23 for the given channel runs across these wiper contacts the wiper circuit section becomes continuous and operative. For example, the wiper circuit section of channel 1 comprises, in series, wiper contact 51, wiper contact 52, normally-closed, relay-actuated contact 61F and normally-closed, relay-actuated contact 62F. This wiper circuit section joins relay 78 in series to complete an operative circuit running from A— to A+. Relay 78 has in parallel with it a relatively large capacitor 79. The other channels have similar wiper circuit sections which are in series with relay 78 between A+ and A—.

Each channel has another circuit involving the end-of-reel wiper contacts for that particular channel. This circuit for channel 1, which is representative of the circuits for the rest of the channels, has in series, running from A+ to A—, relay 73, wiper contact 52 and wiper contact 51. The operability of this circuit likewise depends upon metallic strip 48 closing the gap between wiper contacts 51 and 52.

Also containing relay 77 is a circuit, running from A+ to A—, containing, in series, relay 77, momentary breaking contact 82 which is actuated by relay 77, selector switch 83 and the parallel combination of a normally-open hold switch and a pair of normally-open relay-actuated contacts in parallel with one another. If the selector switch 83 joins channel 1 into this circuit hold switch 84 and contacts 61B and 62B complete the circuit elements. Mechanically linked with each of the hold switches which might appear in this circuit is an individual normally-open switch which, for channel 1, would be switch 86. Each of these latter switches combine in series with a "hold" light in a circuit running from A+ to A—. In channel 1 this "hold" light is light 87.

Relay 77 is a conventional telephone stepper type. It has an arm that cocks when the relay is energized and becomes spring loaded; when the relay is de-energized the spring loaded arm thrusts forward under pressure of the spring. This arm is mechanically linked to the selector switches 56, 59, 64, 67 and 83 which are all ganged together. With each energization-followed-by-de-energization of relay 77 selector switches 56, 59, 64, 67, and 83 are each advanced one step to the next channel in endless cycle.

FIG. 5 shows control panel 14 with the indicating lights showing the operations taking place in the various channels and with the playback, mute and hold switches which enable the operator to control the operations in the various channels.

*Operation.—Recording, Channel 1*

Assume, for the sake of explanation, that ganged selector switches 56, 59, 64, 67, and 83 are in position designating channel 1 as the channel on which an incoming message is to be recorded.

Relay 53, when actuated by the closing of keying relay 54, actuates the movable contacts controlled by it to cause the following results:

(1) Contact 53A closes and acts through selector switch 64 to energize solenoid 38 which bring pinch wheel 31 to bear against shaft 16 for driving the record unit at "normal" speed.

(2) Contact 53B closes to supply B+ to the bias-and-erase oscillator 55 and to record amplifier 57. With contact 53B closed erase head 28 is actuated through selector switch 56 and record head 29 through selector switch 59.

(3) Contact 53C closes to bring about a result which will be explained later.

(4) Contact 53D closes actuating relay 66 through selector switch 67. Relay 66 in turn controls several contacts. As relay 66 is actuated contact 66B closes to energize "recorded" light 69. Also holding contact 66A closes to shunt selector switch 67 and contact 53D so that "recorded" light 69 will stay on after the recording operation has shifted to another channel and will continue to stay on until mute switch 68 is opened.

*Playback, Normal Speed, Channel 1*

Flicking of neutral-biased switch 72 to "normal" speed position will cause relay 61 to be energized through fixed contact 71, switch 72, closed mute switch 68 and closed contact 73A.

Relay 61, when energized, actuates the movable contacts controlled by it to cause the following results:

(1) Contact 61A closes turning on the channel "playback" light 74.

(2) Contact 61B closes to bring about a result which will be described later.

(3) Contact 61C closes to energize solenoid 38 for driving tape 26 at "normal" speed, with shaft 16 as the driver.

(4) Contact 61D moves to its back position transferring head 29 from record amplifier 57 to playback amplifier 75.

(5) Contact 61E closes to shunt out fixed contact 71 and neutral-biased switch 72 so that relay 61 will be de-energized only by the opening of mute switch 68 or contact 73A.

(6) Contact 61F opens to render inoperative the end-of-reel wiper circuit as a means for stepping the ganged selector switches 56, 59, 64, 67 and 83, in a manner later to be described, to the next channel at the end of a playback operation.

*Playback, Fast Speed, Channel 1*

Flicking of neutral-biased switch 72 to "fast" speed position will cause relay 62 to be energized through fixed contact 76, switch 72, closed mute switch 68 and normally-closed relay-actuated contact 73A.

Relay 62, when energized, actuates the movable contacts controlled by it to cause the following results:

(1) Contact 62A closes to turn on channel "playback" light 74.

(2) Contact 62B closes to bring about a result which will be described later.

(3) Contact 62C closes to energize solenoid 41 causing "fast" speed shaft 17 to become the driver for tape 26.

(4) Contact 62D moves to its back position transferring head 29 from record amplifier 57 to playback amplifier 75.

(5) Contact 62E closes to shunt out fixed contact 76 and neutral-biased switch 72 so that relay 62 will be de-energized only by the opening of mute switch 68 or contact 73A.

(6) Contact 62F opens to render inoperative the end-of-reel wiper circuit as a means for stepping the ganged selector switches 57, 59, 64, 67 and 83, in a manner later to be described, to the next channel at the end of a playback operation.

*Operation of Structure Effecting Automatic Record Operation Progressively Throughout Channels and Permitting Selective Exclusion of Channels From Said Record Operation for Either Storage or Playback of Messages Therein*

As noted above, every time stepper relay 77 is energized and then de-energized the ganged selector switches 56, 59, 64, 67 and 83 are "stepped" to the next channel. When the last channel in the series is reached the next stepping action advances the selector switches to the initial channel and the cycle continues in endless fashion, depending for its continuation upon the repeated energization-followed-by-de-energization of relay 77.

When contact 53C is closed by the energization of its controlling relay 53 stepper relay 77 is energized through normally-closed contact 78A. Assume for the sake of explanation that we have been recording on channel 1. As we come to the end of the record operation in channel 1 the metallic strip 48 located at the end of tape 26 will short circuit end-of-reel wiper contact 51 and 52 causing relay 78 to be energized through closed contact 61F and 62F. Relay 78, when energized, opens contact 78A breaking the circuit of relay 77 causing it to be de-energized. Thus we have satisfied the requirement for advancing the ganged selector switches 56, 59, 64, 67 and 83 to the next channel, channel 2. In like fashion throughout the series of record-playback units completion of record operation in a given channel will automatically begin the record operation in the next successive channel.

Since the metallic strip 48 will also short circuit end-of-reel wiper contact 51 and 52 at the end of a playback operation as well as at the end of a record operation and may possibly cause untimely shifting of the ganged selector switches, such as, for example, when a playback operation is finishing in one channel while we are still in the middle of the record operation in another, contacts such as 61F and 62F, controlled by playback relays 61 and 62, respectively, are placed in the end-of-reel wiper circuits and operate to open the end-of-reel wiper circuits for any channel which is being used for playback.

A convenient way of excluding a given channel from the automatic record operation would be to cause the ganged selector switches 56, 59, 64, 67 and 83 when they arrive at such channel to be immediately advanced to the next channel in the series so that, in effect, the channel selected for exclusion is skipped. This is precisely what is done. If we want to store the message in channel 1, for example, hold switch 84 is closed. As selector switch 83 comes around to channel 1 relay 77 is energized and de-energized through the momentary breaking contact 82 which is actuated by relay 77 to momentarily break the circuit. This causes selector switch 83 and its ganged co-switches 56, 59, 64 and 67 to immediately step again to channel 2 so that channel 1 is excluded from the record operation. Contact 86 which is mechanically linked to switch 84 will turn on "hold" light 87. In like manner channel 1 can be excluded from the record operation by the closing of either contact 61B or 62B in response to a "normal" or "fast" speed playback selection for the message in the channel.

It might be desired to exclude a number of channels in series from record operation. Since the circuit containing momentary opening contact 82 will be operative to cause a stepping action only while contact 78A is open a relatively large capacitor 79 is placed in parallel with the controlling relay 78 to insure that contact 78A stays open long enough to meet such contingency.

Relay 73, actuated by the shorting of wiper contacts 51 and 52 by metallic strip 48, opens contact 73A thus insuring that the drive means furnished by shafts 16 or 17 during playback operation is released from driving tape 26 when the supply reel 23 runs out and the playback is completed.

Obviously many modifications and variations of the present invention are possible in the light of the above teachings. It is therefore to be understood that within the scope of the appended claims the invention may be practiced otherwise than as specifically described.

What is claimed is:

1. Apparatus for recording, storage and playback of messages comprising in combination a plurality of individual record-playback units, each of said record-playback units being adapted to being operated in either record or playback or storage operation independently of the type of operation taking place in the balance of said record-playback units, automatic control means operatively associated with said individual record-playback units for causing said individual record-playback units to automatically successively record messages in an endless repetitive cycle and operator-actuated control means for both selectively excluding from said automatically-controlled recording cycle any or all of said record-playback units and concurrently causing the individual excluded record-playback units to undergo storage or playback operation, as the excluding operator elects, said storage and playback operations in the excluded record-playback units being concurrent with the recording operation taking place successively in the unexcluded record-playback units.

2. The apparatus of claim 1 further characterized by indicator means controlled by said automatic control means and said operator-actuated control means for indicating the type of operation, be it record or playback or storage, taking place in any of said record-playback units.

3. The apparatus of claim 1 wherein each of said record-playback units includes means for automatically making a message immediately available for playback after it has been recorded therein.

4. The apparatus of claim 1 wherein said automatic control means comprises selector means for actuating a single record-playback unit in record operation and means responsive to the completion of the record operation in said actuated record-playback unit for shifting said selector means to the next successive record-playback unit for initiating record operation therein.

5. The apparatus of claim 4 wherein said operator-actuated control means includes means for causing said record-actuating selector means to skip past any record-playback unit selected for storage or playback operation.

6. The apparatus of claim 1 wherein each individual record-playback unit comprises a geared supply reel, a complementarily-geared take-up reel smaller in diameter than and cooperatively intermeshing with said supply reel, a continuous magnetic recording tape connected at one end to said supply reel and at its other end to said take-up reel and adapted to be unwound from said supply reel and transferred to said take-up reel during record and playback operations, an erase head and a record-playback head along the path of travel of said tape, guide means for guiding said tape past said erase and record-playback heads, drive means for drawing said tape off said supply reel onto said take-up reel during record and playback operations, means responsive to said automatic control means for making said drive means operative at the beginning of record and playback operations and inoperative at the end of said record and playback operations, spring means weaker than said drive means connected to said supply reel urging it in a direction of rotation counter to the direction of rotation induced by said drive means for both keeping said tape taut when said drive means is operative and for counter-rotating said supply reel when said drive means is released and means for stopping said counter-rotation of said supply reel at the point where said tape is rewound upon said supply reel, preventing further counter-rotation from tearing said tape off said take-up reel.

7. The apparatus of claim 6 wherein said means for stopping counter-rotation of said supply reel when the rewinding operation is completed comprises a pair of shoe members, one each extending from the peripheral portions of said supply reel and said take-up reel, respectively, and positioned on said reels to abut each other at the start of the record-playback unwinding of said tape from said supply reel and when said reels reach this same position on rewind, thereby acting to stop the rewind counter-rotation at the correct spot.

8. The apparatus of claim 6 wherein said automatic control means comprises selector means for actuating a single record-playback unit in record operation and means responsive to the completion of the record operation in said actuated record-playback unit for shifting said selector means to the next successive record-playback unit for initiating record operation therein.

9. The apparatus of claim 8 wherein said means for shifting said unit-actuating selector means comprises stepper relay means controllingly connected to said selector means, a metallic strip spliced into said tape at the end that connects to said supply reel and electrical contact means disposed in wiping contact with said tape while it is on said supply reel for completing with said metallic strip, when said supply reel runs out of said tape at the end of the record operation, an electrical circuit for causing said stepper relay means to advance said selector means to the next successive record-playback unit.

10. The apparatus of claim 9 wherein said operator-actuated control means includes means for causing said record-actuating selector means to skip past any record-playback unit selected for storage or playback operation.

References Cited in the file of this patent

UNITED STATES PATENTS

| | | |
|---|---|---|
| 2,200,351 | Whitehead | May 14, 1940 |
| 2,410,569 | Conant | Nov. 5, 1946 |
| 2,422,143 | Somer et al. | June 10, 1947 |
| 2,507,385 | Shrader | May 9, 1950 |
| 2,514,578 | Heller et al. | July 11, 1950 |
| 2,703,714 | Demby et al. | Mar. 8, 1955 |
| 2,821,576 | Gaubert | Jan. 28, 1958 |
| 2,941,739 | Burke | June 21, 1960 |

FOREIGN PATENTS

| | | |
|---|---|---|
| 685,032 | Great Britain | Dec. 31, 1952 |